US008813075B2

(12) United States Patent  
Nagashima et al.

(10) Patent No.: US 8,813,075 B2  
(45) Date of Patent: Aug. 19, 2014

(54) VIRTUAL COMPUTER SYSTEM AND METHOD OF INSTALLING VIRTUAL COMPUTER SYSTEM

(75) Inventors: Hiromi Nagashima, Yamato (JP); Takashi Shimojo, Hadano (JP); Yasuyuki Hirose, Atsugi (JP); Ryota Noguchi, Hadano (JP)

(73) Assignee: Hitachi, Ltd., Tokyo (JP)

( * ) Notice: Subject to any disclaimer, the term of this patent is extended or adjusted under 35 U.S.C. 154(b) by 134 days.

(21) Appl. No.: 13/243,532

(22) Filed: Sep. 23, 2011

(65) Prior Publication Data

US 2012/0124574 A1 May 17, 2012

(30) Foreign Application Priority Data

Nov. 11, 2010 (JP) .................................. 2010-252438

(51) Int. Cl.  
*G06F 9/455* (2006.01)

(52) U.S. Cl.  
USPC ............................................. 718/1; 717/174

(58) Field of Classification Search  
None  
See application file for complete search history.

(56) References Cited

U.S. PATENT DOCUMENTS

| | | | |
|---|---|---|---|
| 7,386,698 B2* | 6/2008 | Gimpl et al. ................... | 711/173 |
| 8,555,017 B2* | 10/2013 | McCann ....................... | 711/165 |
| 2004/0215917 A1* | 10/2004 | Lambeth et al. ............... | 711/206 |
| 2007/0046791 A1* | 3/2007 | Wang et al. ................. | 348/231.6 |
| 2009/0049160 A1* | 2/2009 | Cherian et al. ................ | 709/222 |
| 2009/0113423 A1* | 4/2009 | Hiltgen et al. ..................... | 718/1 |
| 2010/0125709 A1* | 5/2010 | Hall et al. ..................... | 711/154 |
| 2011/0093861 A1* | 4/2011 | Flemming et al. ............. | 718/104 |

FOREIGN PATENT DOCUMENTS

JP 2000-259434 9/2000

* cited by examiner

*Primary Examiner* — Lewis A Bullock, Jr.  
*Assistant Examiner* — Melissa Alfred  
(74) *Attorney, Agent, or Firm* — Foley & Lardner LLP

(57) ABSTRACT

The user needs to install an OS every LPAR on a virtual computer. Simultaneous OS installing in a plurality of LPARs is implemented by generating a first LPAR (special LPAR), a second LPAR (install mode LPAR), and a third LPAR (normal LPAR) on the basis of LPAR configuration information, copying an OS image to an MMIO space of the first LPAR, allocating the MMIO space of the first LPAR to an MMIO space of the second LPAR, and converting access to the MMIO space of the second LPAR to access to the MMIO space of the first LPAR.

13 Claims, 14 Drawing Sheets

| LPAR NUMBER | LPAR TYPE | MEMORY SIZE | THE NUMBER OF CPUS | ... |
|---|---|---|---|---|
| X | 1 | 0x9000_0000 | 1 | |
| 1 | 2 | 0x9000_0000 | 1 | |
| 2 | 2 | 0x9000_0000 | 1 | |
| 3 | 3 | 0x4000_0000 | 2 | |
| ... | | | | |

LPAR TYPE 1: SPECIAL LPAR
2: INSTALL MODE LPAR
3: NORMAL LPAR

| ENTRY NO. | MAP DESTINATION PHYSICAL MEMORY ADDRESS | REQUEST DESTINATION LPAR NUMBER | LPAR ADDRESS | SIZE |
|---|---|---|---|---|
| 1 | 0x1_0000_0000 | X | 0x1000_0000 | 0x8000_0000 |
| 2 | 0x1_8000_0000 | X | 0x0000_0000 | 0x1000_0000 |
| ... | | | | |

FIG.8

| ENTRY NO. | MAP DESTINATION PHYSICAL MEMORY ADDRESS | REQUEST DESTINATION LPAR NUMBER | LPAR ADDRESS | SIZE |
|---|---|---|---|---|
| 1 | 0x1_0000_0000 | X | 0x1000_0000 | 0x8000_0000 |
| 2 | 0x1_0000_0000 | 1 | 0x1000_0000 | 0x8000_0000 |
| 3 | 0x1_0000_0000 | 2 | 0x1000_0000 | 0x8000_0000 |
| 4 | 0x1_8000_0000 | X | 0x0000_0000 | 0x1000_0000 |
| 5 | 0x1_9000_0000 | 1 | 0x0000_0000 | 0x1000_0000 |
| 6 | 0x1_A000_0000 | 2 | 0x0000_0000 | 0x1000_0000 |
| 7 | 0x1_B000_0000 | 3 | 0x0000_0000 | 0x4000_0000 |
| ... | | | | |

| ENTRY NO. | MAP DESTINATION PHYSICAL MEMORY ADDRESS | REQUEST DESTINATION LPAR NUMBER | LPAR ADDRESS | SIZE |
|---|---|---|---|---|
| 1 | 0x1_B000_0000 | 3 | 0x0000_0000 | 0x4000_0000 |
| ... | | | | |

| LPAR NUMBER | LPAR TYPE | MEMORY SIZE | THE NUMBER OF CPUS | ... |
|---|---|---|---|---|
| X | 3 | 0x4000_0000 | 1 | |
| 1 | 3 | 0x8000_0000 | 1 | |
| ... | | | | |

LPAR TYPE 1: SPECIAL LPAR
2: INSTALL MODE LPAR
3: NORMAL LPAR

FIG.14

| ENTRY NO. | MAP DESTINATION PHYSICAL MEMORY ADDRESS | REQUEST DESTINATION LPAR NUMBER | LPAR ADDRESS | SIZE |
|---|---|---|---|---|
| 1 | 0x1_B000_0000 | X | 0x0000_0000 | 0x4000_0000 |
| 2 | 0x1_F000_0000 | 1 | 0x0000_0000 | 0x8000_0000 |
| ... | | | | |

1041

US 8,813,075 B2

VIRTUAL COMPUTER SYSTEM AND METHOD OF INSTALLING VIRTUAL COMPUTER SYSTEM

INCORPORATION BY REFERENCE

The present application claims priority from Japanese application JP 2010-252438 filed on Nov. 11, 2010, the content of which is hereby incorporated by reference into this application.

BACKGROUND OF THE INVENTION

The present invention relates to a virtual computer system having a hypervisor and a method of installing the virtual computer system.

As a virtual computer system, for example, a virtual computer system having a hypervisor to manage a plurality of virtual computers is known (for example, JP-A-2000-259434).

SUMMARY OF THE INVENTION

In general, the virtual computer is utilized by a client (user). For example, the virtual computer processes a request from the client as a server The virtual computer can have a plurality of LPARs Logical Partitions) The virtual computer causes an OS (operating system) to operate on an LPAR. The OS operates if it is installed in an LPAR. However, it is necessary to conduct OS installing as many times as the number of LPARs.

In general, a USB (universal serial bus)-CD (compact disc) drive is used to install an OS in an LPAR. At this time, the USB-CD drive can be used only in a single LPAR. In other words, it is necessary for the user to install the OS in each LPAR on the virtual computer. As the number of LPARs increases, the burden on the user increases.

As a method for reducing the burden on the user, it is conceivable to install the OS in a plurality of LPARs simultaneously. In the current system, however, it is necessary to install the OS in the LPAR by utilizing the USB-CD drive. Furthermore, a CD image can be handled only in a single LPAR, and the CD image cannot be handled in a plurality of LPARs simultaneously. Therefore, the user cannot install the OS in a plurality of LPARs simultaneously.

In view of the problems, an object of the present invention is to provide a virtual computer system in which the user can install the OS in a plurality of LPARs simultaneously.

In order to solve the problems, in a virtual computer system and its installing method, the virtual computer system includes a physical computer having a physical memory and a physical CPU, a plurality of LPARs operating on the physical computer, an install unit connected to the physical computer, the install unit having an OS image which is an OS to be installed in the LPARs, and an installer for installing the OS image, and a hypervisor for exercising control to cause the plurality of LPARs to operate on the physical computer. And the hypervisor generates a first LPAR and a second LPAR on the basis of LPAR setting information for managing the LPARs, allocates a part of the physical memory to a memory area of the first LPAR, copies the OS image to the memory area of the first LPAR allocates the memory area of the first LPAR having the OS image copied thereto, to a part of a memory area of the second LPAR, and reads out the OS image from the memory area of the first LPAR and installs the OS in the second LPAR.

Furthermore, the hypervisor incorporates a driver that the hypervisor has, into an installer included in a CD which is copied to a special LPAR, and copies the installer to a plurality of install mode LPARs.

According to the present invention, it becomes possible for a plurality of install mode LPARs to read out a copied OS image by accessing memory areas (for example, MMIO spaces) of themselves, and simultaneous OS installing in a plurality of LPARs is implemented. In other words, since the OS image can be handled in a plurality of LPARs simultaneously, the OS can be installed in the plurality of LPARs simultaneously.

Other objects, features and advantages of the invention will become apparent from the following description of the embodiments of the invention taken in conjunction with he accompanying drawings.

BRIEF DESCRIPTION OF THE DRAWINGS

FIG. 4 is a configuration table of LPARs created in a hypervisor;

FIG. 6 shows a virtual memory map table allocated to a special LPAR;

FIG. 8 shows a virtual memory map table allocated to all LPARs;

FIG. 10 shows a virtual memory map allocated to all LPARs after installing is completed;

FIG. 12 is a configuration table of LPARs created in a hypervisor, in a configuration example after OS installing is finished;

FIG. 14 is a virtual memory map table allocated to LPARs, in the configuration example after OS installing is finished.

DESCRIPTION OF THE EMBODIMENTS

Figure 1:
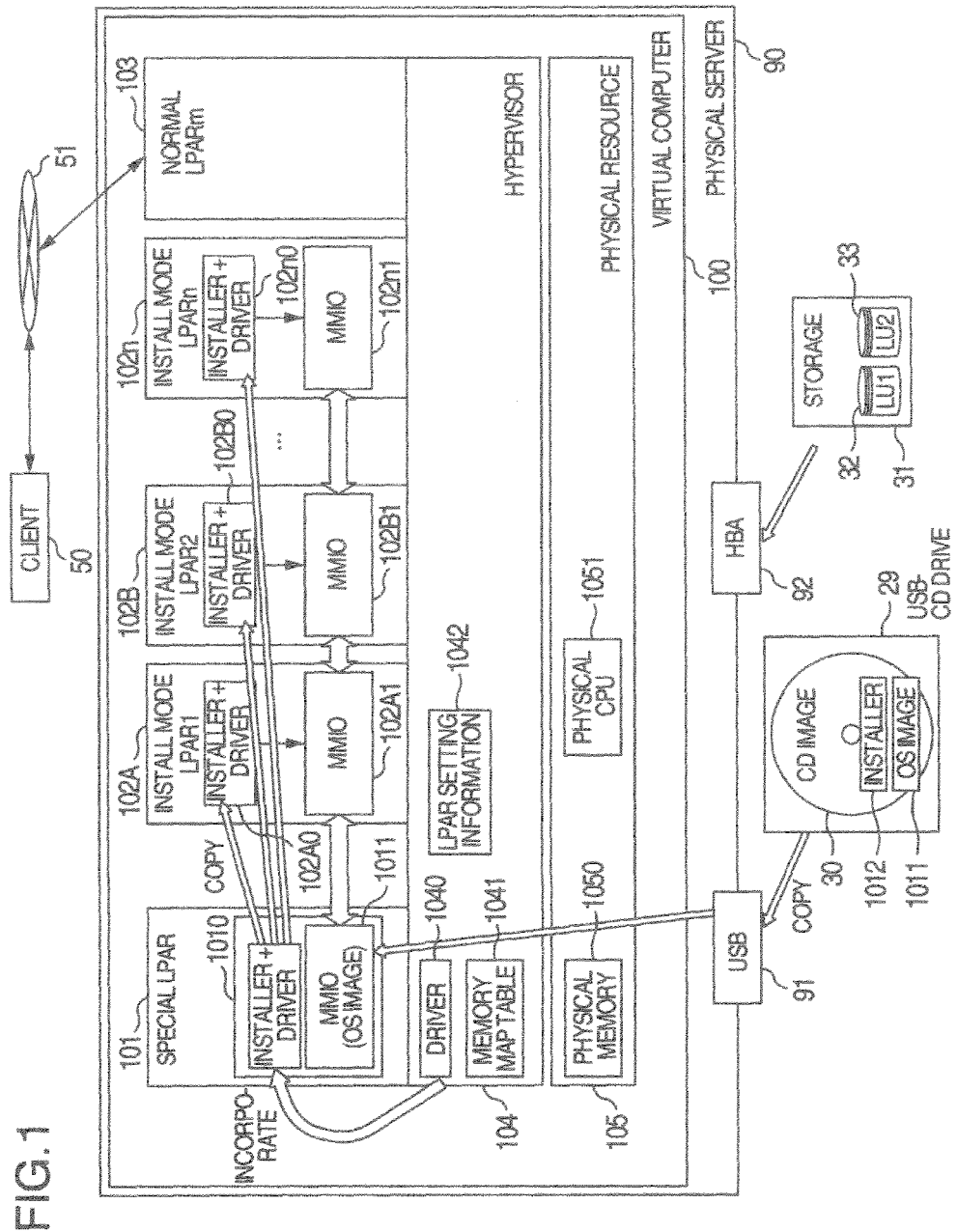
FIG. 1 is a configuration diagram of a virtual computer system in an embodiment.

Hereafter, a virtual computer system according to the present invention will be described with reference to the drawings. FIG. 1 shows a virtual computer system according to the present invention.

A virtual computer 100 includes a physical resource 105 and a hypervisor 104. On the hypervisor 104, LPARs are operating under control of the hypervisor 104. As LPARs, there are an LPAR which operates as a server at the time of normal operation and LPARs which operate at the time of OS installing. For example, the LPAR which normally operates as a server is a normal LPAR 103. As LPARs which operate at the time of OS installing, there are a special LPAR 101, an install mode LPAR1 (102A), an install mode LPAR2 (102B), and an install mode LPARn (102n).

The normal LPAR 103 is an LPAR utilized by a client 50 which is external to the virtual computer system. For example, the normal LPAR 103 accepts an I/O (Input/Output)

command from the client 50 via a communication network 51, and processes the I/O command.

The special LPAR 101 is an LPAR which is not utilized by the client 50, and hidden from the client 50 by the hypervisor 104.

The install mode LPAR1 (102A), the install mode LPAR2 (102B), and the install mode LPARn (102n) are LPARs created to conduct OS installing. These install mode LPARs are not utilized by the client 50.

When installing the OS in the LPARs a CD image 30 which is media for installing the OS to be installed in the LPARs is connected to a USB terminal 91 included in a physical server 90 by, for example, a user by using, for example, a USB-CD drive 29. An installer 1012 and an OS image 1011 are stored in the CD image 30.

The special LPAR 101 is given right of using the CD image 30 which is media for installing the OS to be installed in the LPAR, by the hypervisor 104. The special LPAR 101 copies the installer 1012 and the OS image 1011 from the CD image 30 into a memory space of the special LPAR 101 itself.

The OS is read out from the OS image 1011 into a logical unit (LU) 32 or a LU 33 in a storage 31 connected to a host bus adapter (HBA) 92 of a fiber channel included in a physical server 90, by the installer 1012 and installed.

The hypervisor 104 issues a request to the special LPAR 101 to incorporate a driver 1040 included in the hypervisor 104 into the installer 1012 included in the special LPAR 101.

Upon receiving the incorporation request of the driver 1040 from the hypervisor 104, the special LPAR 101 incorporates the driver 1040 into the installer 1012. The hypervisor 104 copies the installer 1010 having the driver 1040 incorporated therein to the install mode LPAR1 (102A), the install mode LPAR2 (102B), and the install mode LPARn (102n).

The hypervisor 104 includes a virtual memory map table 1041 indicating that a memory space to which the OS image 1011 of the special LPAR 101 has been copied is allocated to a memory mapped input/output space (hereafter referred to as MMIO space) 102A1 in the install mode LPAR1 (102A), an MMIO space 102B1 in the install mode LPAR2 (102B), and an MMIO space 102n1 in the install mode LPARn (102n).

Here, the MMIO space is a memory accessed from only a specific driver (the driver 1040 incorporated into the installer 1012 in the present invention), and the MMIO space is an area which is not installed from a program other than the installer. If a physical memory which is not a MMIO space were used, there is a possibility that contents of the physical memory which is not the MMIO space would be changed by an access from another program. Specifically if rewriting of a physical memory due to an external application or the like is generated besides rewriting of the physical memory due to a memory access generated during OS installing, then the OS installing fails. In the present embodiment, therefore, it is necessary to map the MMIO spaces to respective LPARs.

Furthermore, the hypervisor 104 has LPAR setting information 1042 for managing numbers and memory sizes of the LPARs.

The physical resource 105 includes a physical memory 1050 and a physical CPU 1051.

Figure 2:
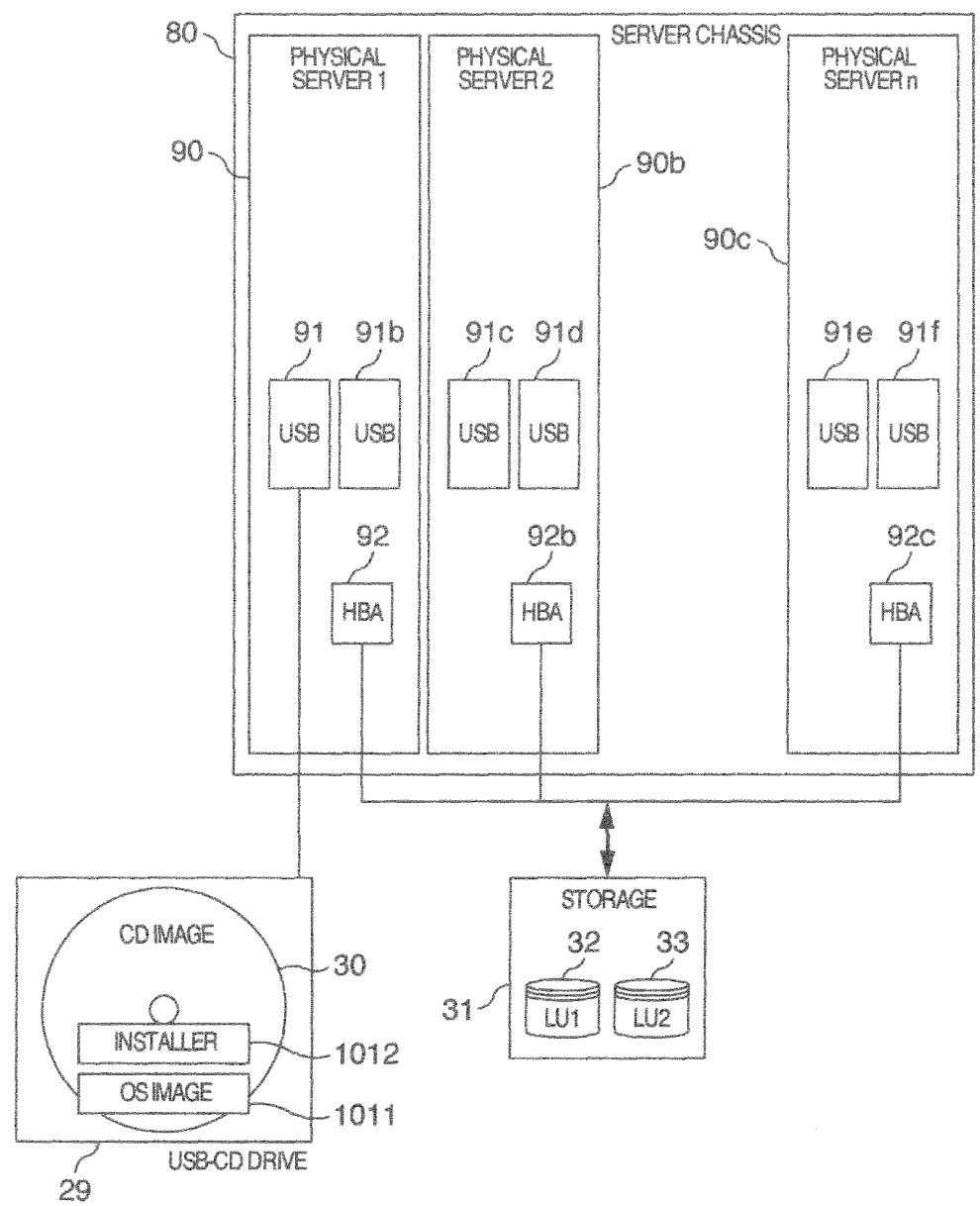
FIG. 2 is a configuration diagram of a server system.

FIG. 2 shows a server system formed of a plurality of physical servers including a physical server 1 (90), a physical server 2 (90*b*), and a physical server n (90*c*) mounted on a server chassis 80. A plurality of physical servers (90, 90*b*, and 90*c*) can be stored in the server chassis 80. The physical servers (90, 90*b* and 90*c*) include USB terminals (91, 91*b*, 91*c*, 91*d*, 91*e* and 91*f*) and host bus adapters (FBAs) (92, 92*b* and 92*c*).

When handling the CD image 30, for example, the USB-CD drive 29 is inserted into the USB terminal 91 included in the physical server 1 (90) and used. When handling the storage 31, the storage 31 is connected to the HBA 92 included in the physical server 1 (90) and used. FIG. 1 described before can be said to be a drawing which shows, for example, the physical server 1.

Figure 3:
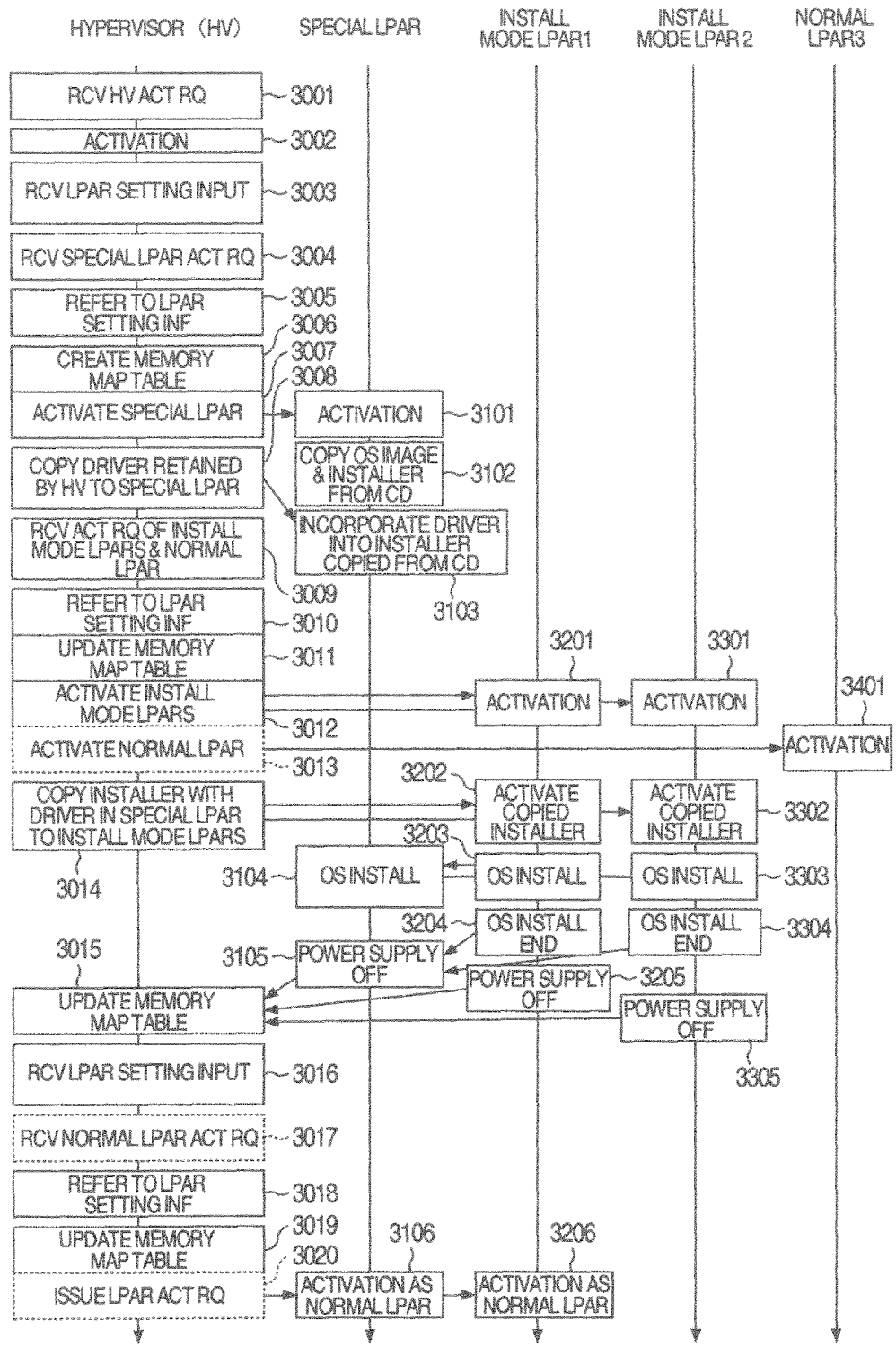
FIG. 3 is a diagram showing a flow of simultaneous OS installing processing in a plurality of LPARs.

FIG. 3 shows a flow of simultaneous OS install processing of a plurality of LPARs. Hereafter, the simultaneous OS installing scheme in a plurality of LPARs will be described with reference to FIGS. 3 to 10.

(Step 3001) The hypervisor (HV) 104 receives a hypervisor activation request (HV ACT RQ). The activation request of the hypervisor 104 is input by, for example, a user or the like.

(Step 3002) Upon receiving the activation request (ACT RQ), the hypervisor 104 is activated.

(Step 3003) After the activation of the hypervisor 104 is completed, the hypervisor 104 receives an LPAR setting input. The LPAR setting input is input to the hypervisor 104 by, for example, a user or the like. Upon receiving the LPAR setting input, the hypervisor 104 creates LPAR setting information (INF) 1042 shown in FIG. 4.

The LPAR setting information 1042 retains LPAR numbers, LPAR types, memory sizes, the number of CPUs, and the like of respective LPARs. The LPAR number is a number for identifying an LPAR. The LPAR type is an identifier for identifying which of a special LPAR, an install mode LPAR a normal LPAR is the LPAR. In the present embodiment, an identifier of a special LPAR is set to "1", an identifier of an install mode LPAR is set to "2," and an identifier of a normal LPAR is set to "3". The memory size is a size of a memory allocated when an LPAR is activated. The number of CPUs is the number of CPU cores allocated when an LPAR is activated.

(Step 3004) The hypervisor receives an input of activation request of the special LPAR 101, The activation request of the special LP 101 is input by, for example, a user or the like.

(Step 3005) Upon receiving the special LPAR activation request, the hypervisor 104 refers to setting information concerning the special LPAR 101 included in the LPAR setting information 1042 shown in FIG. 4.

(Step 3006) The hypervisor 104 creates a memory map 501 of a physical memory and a memory map 502 of a special LPAR to be activated hereafter, on the basis of setting information concerning the special LPAR 101 included in the LPAR setting information1042 referred to. By the way, table representation of FIG. 5 is the virtual memory map table 1041 shown in FIG. 6.

(Step 3007) The hypervisor 104 outputs an activation request o the special LPAR 101.

Figure 5:
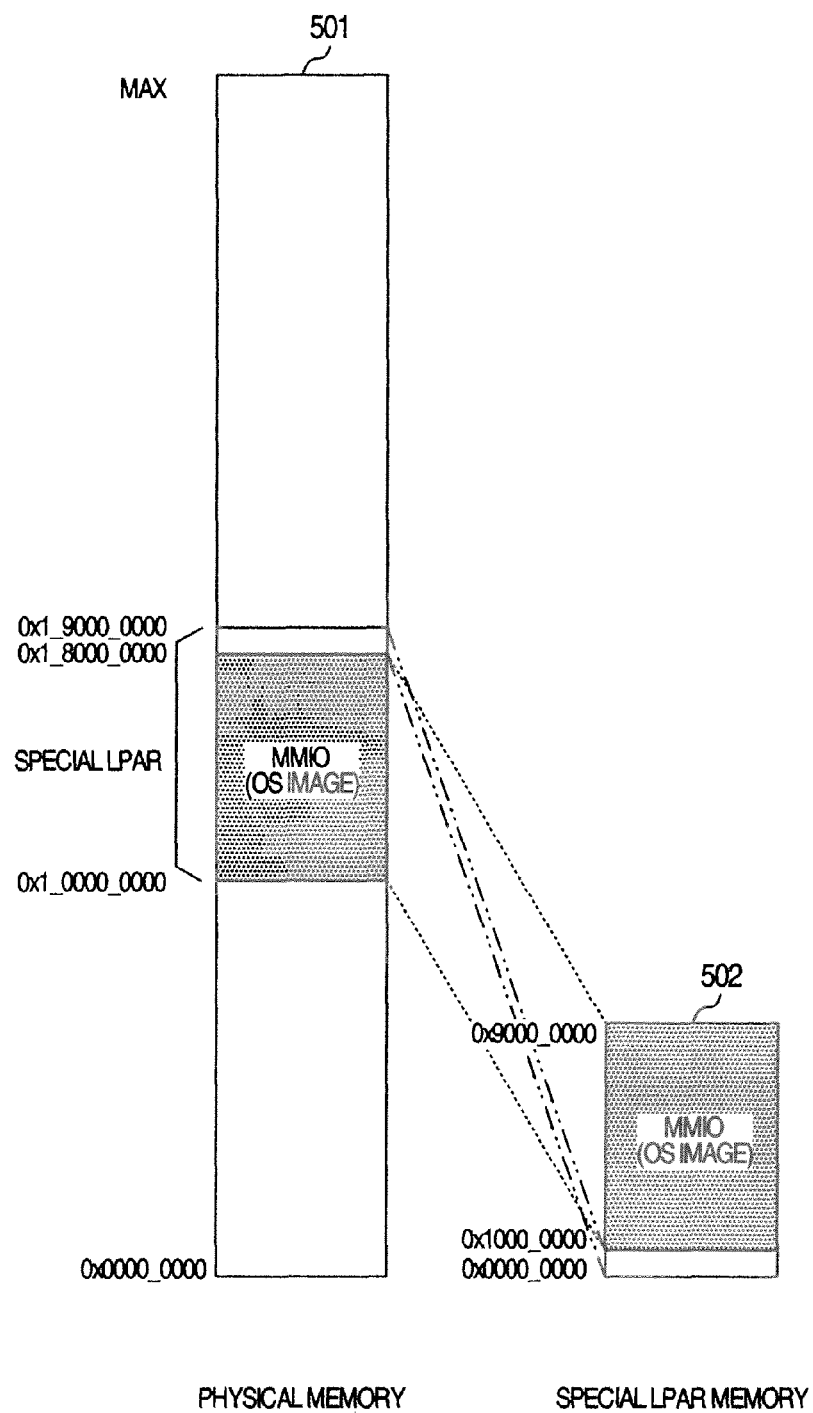
FIG. 5 shows a virtual memory map allocated to a special LPAR.

FIG. 5 is a virtual memory map of the whole system. As virtual memory maps of the whole system at this timing (step 3006), there are the memory map 501 of the physical memory and the memory map 502 of the special LPAR.

The virtual memory map and the virtual memory map table 1041 of the whole system in the present embodiment are created by the hypervisor 104, and used by the hypervisor 104 to manage situation of allocation of the physical memory 1050 to LPARs. By the way, the virtual memory map of the whole system is updated by the hypervisor 104 suitably at the time of activation of an LPAR, power supply turnoff, or the like.

In the present embodiment, as regards the address of the physical memory 1050 0x00000000 is designated physical first address, 0x100000000 is designated physical second address, 0x180000000 is designated physical third address, and 0x190000000 is designated physical fourth address. Furthermore, as regards the memory address allocated to the special LPAR 101, 0x00000000 is designated special first address, 0x10000000 is designated special second address, and 0x90000000 is designated special third address.

And a physical memory ranging from the physical second address to the physical fourth address (0x190000000−0x100000000=memory size 0x90000000) is allocated as a special LPAR memory to be used by the special LPAR 101. Specifically, an area of a memory size 0x90000000 ranging from the special first address in the special LPAR 101 is allocated as a memory to be used by the special LPAR 101 allocated onto the physical memory.

At this time, the hypervisor 104 allocates a physical memory ranging from the physical second address to the physical third address to the special second address to the special third address as a memory to be used by the special LPAR 101 allocated onto a physical memory to be used by the special LPAR 101. In other words, a memory area to be used by the special LPAR 101 on a physical memory allocated to the special LPAR 101 is the same as a memory space of the special LPAR 101 itself.

FIG. 6 shows a virtual memory map table 1041 obtained by representing the memory map 501 of the physical memory shown in FIG. 5 and the memory map 502 of the special LPAR as a table. An entry No. 1 indicates that a memory which is 0x100000000 in physical memory address and 0x80000000 in size is allocated to an address 0x10000000 of an LPAR number X (special LPAR 101). An entry No. 2 indicates that a memory which is 0x180000000 in physical memory address and 0x10000000 in size is allocated to an address 0x00000000 of the LPAR number X (special LPAR 101).

(Step 3101) Upon receiving an activation request from the hypervisor 104, the special LPAR 101 is activated.

(Step 3102) Upon being activated, the special LPAR 101 reads out the OS image 1011 and the installer 1012 from the CD image 30. And the special LPAR 101 copies the OS image 1011 and the installer 1012 read out to a physical memory which is an MMIO space allocated to the special LPAR 101. The USB-CD drive 29 is inserted into the USB terminal 91 in the front by, for example, the user.

(Step 3008) After activating the special LPAR 101, the hypervisor 104 outputs a request to the special LPAR 101 to incorporate the driver 1040 retained by the hypervisor 104 beforehand into the installer 1012 which is retained by a memory allocated to the special LPAR 101.

(Step 3103) The special LPAR 101 incorporates the driver 1040 copied from he hypervisor 104 into the installer 1012.

(Step 3009) The hypervisor 104 receives activation requests of the install mode LPAR1 (102A), the install mode LPAR2 (102B), and the normal LPAR 103. The activation requests are input to the hypervisor 104 by, for example, the user or the like.

(Step 3010) The hypervisor 104 refers to LPAR setting information concerning the install mode LPAR1 (102A), the install mode LPAR2 (1028), and the normal LPAR 103, activation requests of which have been received at the step 3009, included in the LPAR setting information 1042 shown in FIG. 4.

Figure 7:
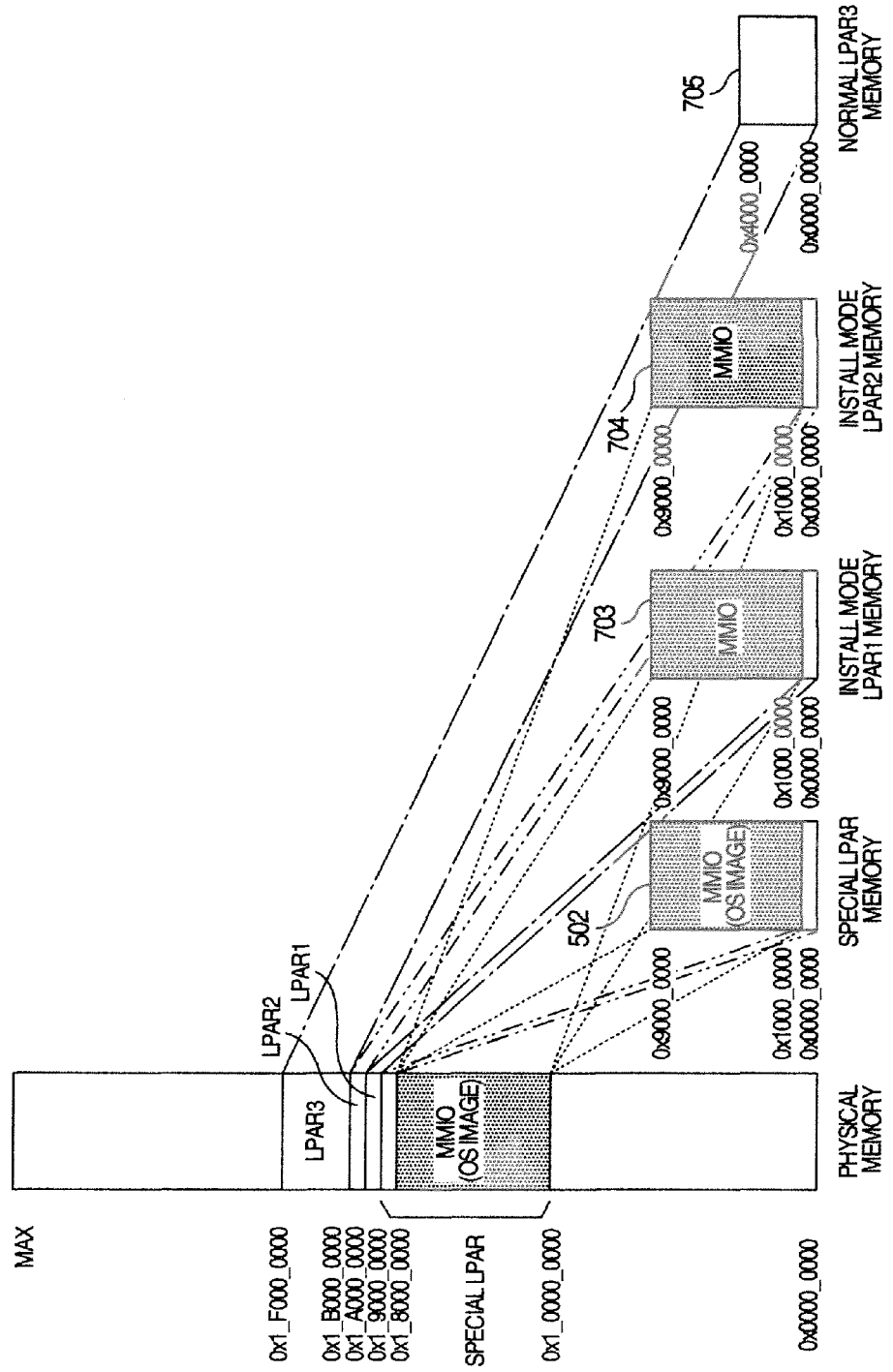
FIG. 7 shows a virtual memory map allocated to all LPARs.

(Step 3011) The hypervisor 104 updates the virtual memory map of the whole system shown in FIG. 5 and the virtual memory map table 1041 shown in FIG. 6 on the basis of the LPAR setting information concerning the install mode LPAR1 (102A), the install mode LPAR2 (102B), and the normal LPAR 103 referred to. The virtual memory map of the whole system after the update is shown in FIG. 7. The virtual memory map table 1041 after the update is shown in FIG. 8.

At the step 3011, a memory map 703 of the install mode LPAR1 to be activated hereafter, a memory map 704 of the install mode LPAR2 to be activated hereafter, and a memory map 705 of the normal LPAR to be activated hereafter are created besides the memory map 501 of the physical memory and the memory map 502 of the special LPAR, as the virtual memory maps of the whole system by the hypervisor 104.

As for the address name in the physical memory 1050, 0x00000000 is designated physical first address, 0x100000000 is designated physical second address, 0x180000000 is designated physical third address, 0x190000000 is designated physical fourth address, 0x1A0000000 is designated physical fifth address, 0x1B0000000 is designated physical sixth address, and 0x1F0000000 is designated physical seventh address in order from the low-order address in the same way as FIG. 5. As regards the special LPAR 101 as well, 0x00000000 is designated special first address, 0x10000000 is designated special second address, and 0x90000000 is designated special third address in order from the low-order address in the same way. As regards the install mode LPAR1 (102A) as well, 0x00000000 is designated install 1 first address, 0x10000000 is designated install 1 second address, and 0x90000000 is designated install 1 third address in order from the low-order address in the same way. As regards the install mode LPAR2 (102B) as well 0x00000000 is designated install 2 first address, 0x10000000 is designated install 2 second address, and 0x90000000 is designated install 2 third address in order from the low-order address in the same way. As regards the normal LPAR 103 as well, 0x00000000 is designated normal first address, and 0x40000000 is designated normal second address in order from the low-order address in the same way.

The hypervisor 104 has already allocated a physical memory (memory size 0x90000000) ranging from the physical second address to the physical fourth address to the special LPAR 101, the activation request of which has been received, at the step 3006. Furthermore, The hypervisor 104 has already allocated a physical memory ranging from the physical second address to the physical fourth address to the special second address to the special third address.

In the update processing at the step 3011, therefore, a physical memory ranging from the physical fourth address to the physical fifth address is allocated to the install 1 first address to the install 1 second address for the install mode LPAR1 (102A), the activation request of which has been received. In addition, a physical memory which is an area having the OS image 1011 ranging from the physical second address to the physical third address copied thereto, is allocated to the install 1 second address to the install 1 third address. Also at the tune of activation of the install mode LPAR2 (102B), the activation request of which has been received, a physical memory ranging from the physical fifth address to the physical sixth address is allocated to the install 2 first address to the install 2 second address in the same way. In addition, a physical memory which is an area having the OS image 1011 ranging from the physical second address to the physical third address copied thereto, is allocated to the install 2 second address to the install 2 third address.

In other words, in the present invention, a physical memory area ranging from the physical second address to the physical third address in the physical memory is allocated to the special LPAR 101, the install mode LPAR1 (102A), and the install mode LPAR2 (102B). In this way, a physical memory area having the OS image 1011 of the special LPAR 101 copied thereto is allocated to the install mode LPAR1 (102A)

and the install mode LPAR2 (102B). As a result, it becomes possible for a plurality of LPARs to access the OS image 1011 simultaneously.

FIG. 8 shows a virtual memory map table 1041 showing virtual memory maps in FIG. 7 An entry No. 1 indicates that a memory which is 0x100000000 in physical memory address and 0x80000000 in size is allocated to an address 0x10000000 of an LPAR number X (special LPAR 101). An entry No. 2 indicates that a memory which is 0x100000000 in physical memory address and 0x80000000 in size is allocated to an address 0x10000000 of an LPAR number 1 (install mode LPAR1 (102A)). An entry No. 3 indicates that a memory which is 0x100000000 in physical memory address and 0x80000000 in size is allocated to an address 0x10000000 of an LPAR number 2 (install mode LR (102B)). An entry No. 4 indicates that a memory which is 0x180000000 in physical memory address and 0x10000000 in size is allocated to an address 0x10000000 of an LPAR number X (special LPAR 101). An entry No. 5 indicates that a memory which is 0x190000000 in physical memory address and 0x10000000 in size is allocated to an address 0x10000000 of an LPAR number 1 (install mode LPAR1 (102A)). An entry No. 6 indicates that a memory which is 0x1A0000000 in physical memory address and 0x10000000 in size is allocated to an address 0x10000000 of an LPAR number 2 (install mode LPAR2 (102B)). An entry No. 7 indicates that a memory which is 0x1B0000000 in physical memory address and 0x40000000 in size is allocated to an address 0x00000000 of an LPAR number 3 (normal LPAR3 (103)).

The mapping destination physical memory addresses indicated by the entry No. 1, the entry No. 2 and the entry No. 3 have the same value, and the sizes indicated by the entry No. 1, the entry No. 2 and the entry No. 3 have the same value. In other words, the hypervisor 104 conducts physical memory allocation management, and allocates the same physical memory to the special LPAR, the install mode LPAR1, and the install mode LPAR2. The virtual memory map table 1041 is updated by the hypervisor 104.

(Step 3012) After the update of the virtual memory map table 1041, the hypervisor 104 activates the install mode LPAR1 (102A) and the install mode LPAR2 (102B).

By the way, in the case where only the OS installing in a plurality of LPARs is conducted, the hypervisor 104 activates only the install mode LPARs at the step 3012. As a matter of course, the normal LPAR may be activated as represented by (step 3013), or a normal LPAR may already exist, in the case where the install mode LPARs and the normal LPAR are activated, an activation request of the normal LPAR is received together with an activation request of the install mode LPARs at the step 3009.

(Step 3201) Upon receiving an activation request the hypervisor 104, the install mode LPAR1 (102A) is activated.

(Step 3301) Upon receiving an activation request from the hypervisor 104, the install mode LPAR2 (102B) is activated.

(Step 3401) Upon receiving an activation request from the hypervisor 104, the normal LPAR 103 is activated.

(Step 3014) The hypervisor 104 copies an installer having a driver created at the step 3103 incorporated therein (hereafter referred to simply as installer 1010) from the special LPAR 101 to the install mode LPAR1 (102A) and the install mode LPAR2 (102B).

(Step 3202) The install mode LPAR1 (102A) activates an installer 102A0 copied by the hypervisor 104.

(Step 3302) The install mode LPAR2 (102B) activates an installer 102B0 copied by the hypervisor 104.

(Step 3203) The install mode LPAR1 (102A) conducts OS install processing.

(Step 3303) The install mode LPAR2 (102B) conducts OS install processing.

(Step 3104) The special LPAR 101 replies to the OS install processing of the install mode LPAR1 (102A) and the install mode LPAR2 (102B).

Figure 11:
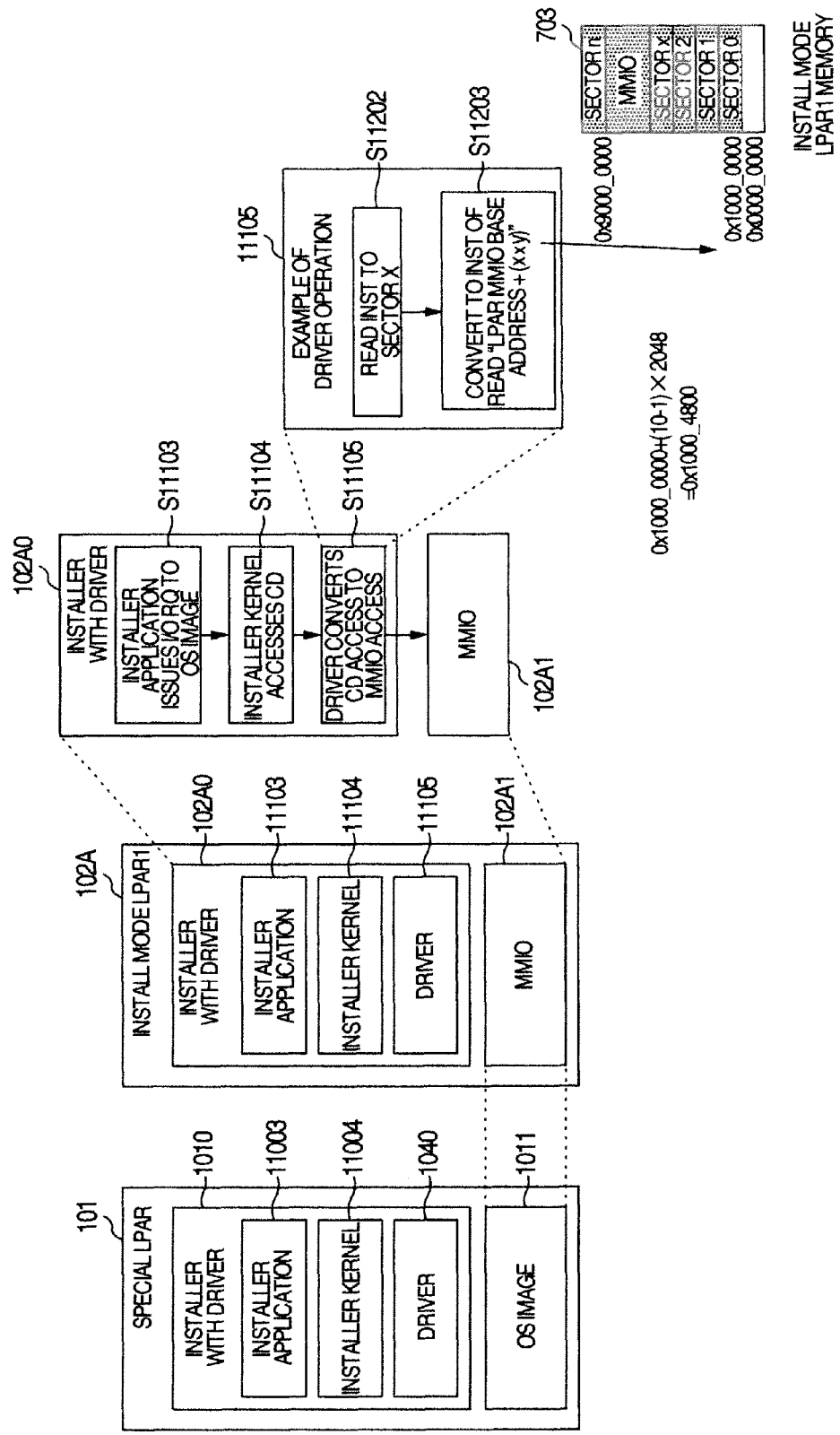
FIG. 11 is a concept diagram of an outline of install processing.

FIG. 11 shows an example of an outline of OS install processing to the install mode LPAR1 (102A). The special LPAR 101 and the install mode LPAR1 (102A) have installers (1010 and 102A0) having drivers incorporated therein, installer applications (11003 and 11103), installer kernels (11004 and 11104), and drivers (1040 and 11105), respectively. Furthermore, the special LPAR 101 has the OS image 1011, and the install mode LPAR1 (102A) has the MMIO space 102A1.

(Step 11103) If the OS install processing is executed at the step 3203 and the step 3303, then the installer application 11103 in the install mode LPAR1 (102A) issues an I/O request to the OS image 1011.

(Step 11104) Upon receiving an I/O access to the OS image, the installer kernel 11104 accesses the OS image 1011 via the driver 11105.

(Step 11105) At this time, the driver 11105 converts access to the OS image 1011 to access to the MMIO space 102A1. The conversion to the access to the MMIO space 102A1 is conducted as follows. Upon receiving a read instruction for a sector x, the driver 11105 incorporated into the installer converts the read instruction to a read instruction for an address represented as "a base address of the MMIO space in the install mode LPAR1 (102A)+x×2048" (where one sector is 2048 bytes). At the step 11105, the access to the MMIO space 102A1 becomes the access to the OS image 1011 and the OS installing is conducted.

(Step 3204) In the install mode LPAR1 (102A), the OS installing processing is completed.

(Step 3304) In the install mode LPAR2 (102B), the OS installing processing is completed.

(Step 3205) If the installing processing is finished at the step 3204, the install mode LPAR1 (102A) turns off in power supply.

(Step 3305) If the installing processing is finished at the step 3304, the install mode LPAR2 (102B) turns off in power supply.

(Step 3105) In response to finish of the OS install processing in all install mode LPARs at the step 3204 and the step 3304, the special LPAR 101 turns off in power supply.

Figure 9:
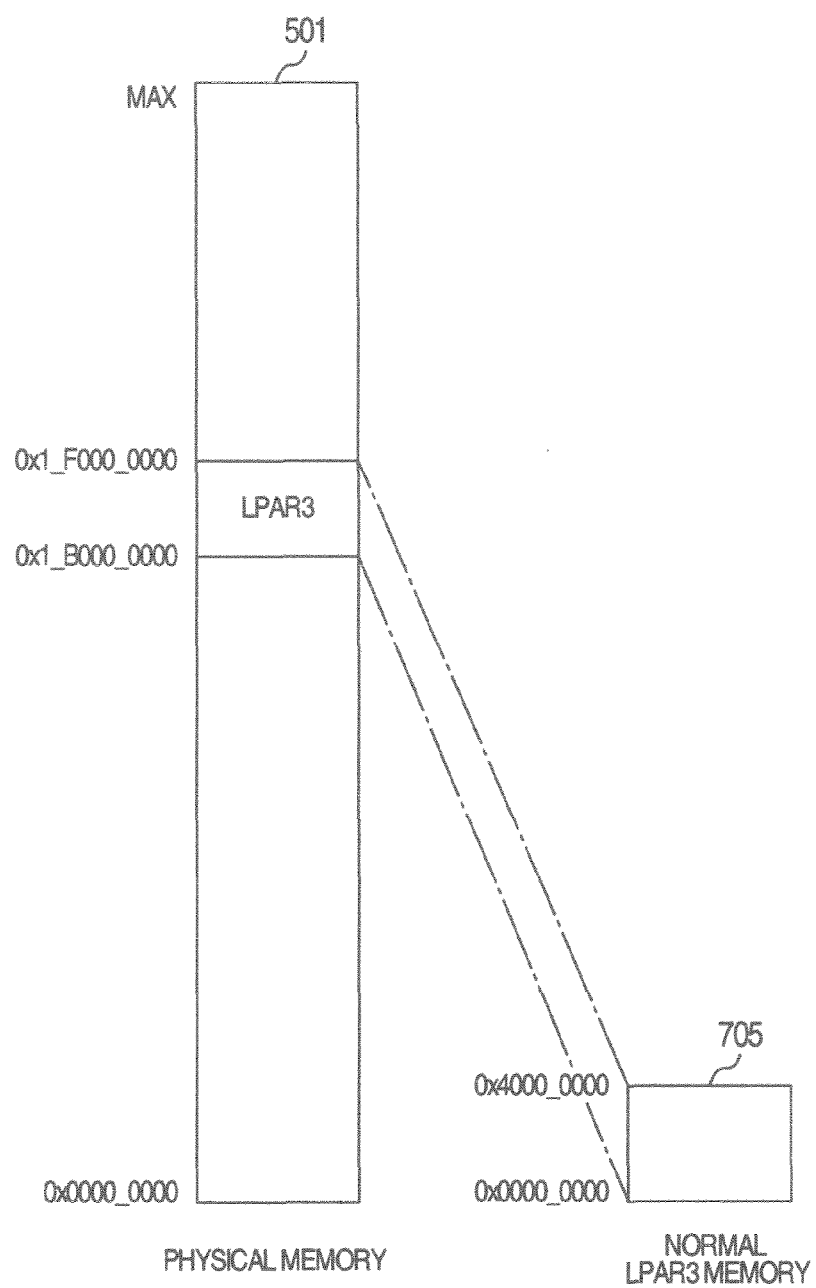
FIG. 9 shows a virtual memory map allocated to all LPARs after installing is completed.

(Step 3015) Upon detecting the power supply off of the special LPAR 101, the install mode LPAR1 (102A), and the install mode LPAR2 (102B), the hypervisor 104 updates the virtual memory map table of the whole system shown in FIG. 7 and the virtual memory map table 1041 shown in FIG. 8 on the basis of detected information to release the memory allocated to the LPARs which are detected to turn off in power supply (in the present embodiment, the special LPAR 101, the install mode LPAR1 (102A), and the install mode LPAR2 (102B)). The virtual memory map of the whole system after the update is shown in FIG. 9, and the virtual memory map table 1041 after the update is shown in FIG. 10. FIG. 9 is the virtual memory map of the whole system immediately after the power supply is turned of in the special LPAR 101, the install mode LPAR1 (102A), and the install mode LPAR2 (102B) after completion of the simultaneous installing of the OS in a plurality of LPARs. At the step 3015, the memory map 501 of the physical memory and the memory map 705 of the normal LPAR3 exist as the virtual memory map of the whole system. By comparing FIG. 9 with FIG. 7, It is appreciated that the memory allocated to the special LPAR 101, the install mode LPAR1 (102A), and the install mode LPAR2 (102B) has been released.

FIG. 10 shows the virtual memory map table 1041 corresponding to the virtual memory map shown in FIG. 9. An entry No. 1 indicates that a memory which is 0x1B0000000 in physical memory address and 0x40000000 in size is allocated to an address 0x00000000 of the LPAR number 3 (normal LPAR 103).

As step 3016 and subsequent steps, a process for using the LPARs which have been used as the special LPAR and the install mode LPARs, as normal LPARs (for example, servers) after the OS installing processing is finished will now be described.

(Step 3016) The hypervisor 104 updates the virtual memory map table 1041, and then newly receives, for example, an LPAR setting input such as LP setting information 1043 shown in FIG. 12.

(Step 3017) The hypervisor 104 receives a LPAR activation request (activation request of a normal LPAR).

(Step 3018) The hypervisor 104 refers to the LPAR setting information 1043 concerning a normal LPAR for which an activation request is given at the step 3017

Figure 13:
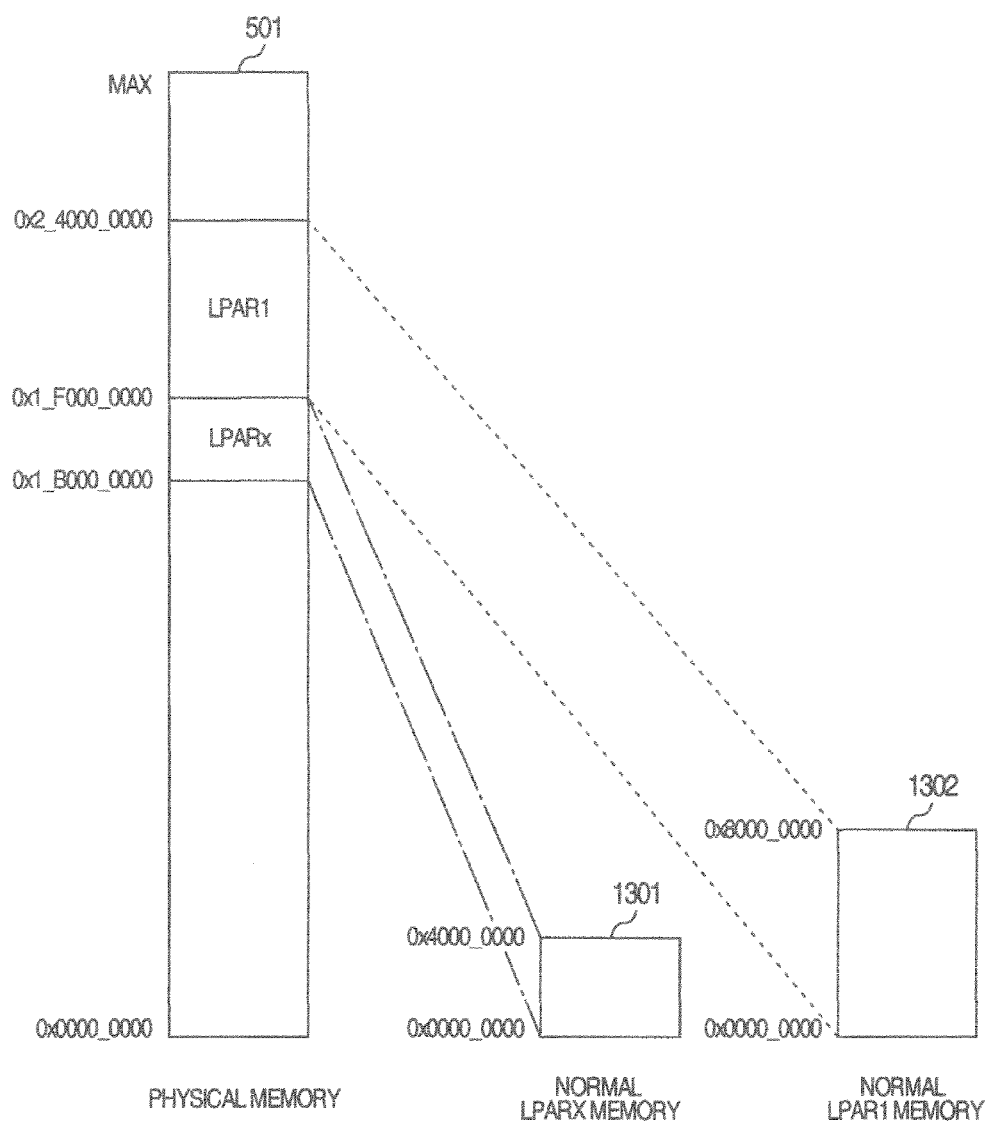
FIG. 13 is a virtual memory map allocated to LPARs, in the configuration example after OS installing is finished.

(Step 3019) The hypervisor 104 refers to the LPAR setting information 1043 concerning the normal LPAR referred to, and updates the virtual memory map of the whole system shown in FIG. 9 and the virtual memory map table 1041 shown in FIG. 10. The virtual memory map of the whole system updated at the step 3019 is shown in FIG. 13, and the virtual memory map table 1041 which is updated is shown in FIG. 14. At the step 3019, a memory map 1301 of the normal LPAR to be activated hereafter and a memory map 1302 of the normal LPAR1 to be activated hereafter are created.

(Step 3020) The hypervisor 104 issues an LPAR activation request.

(Step 3106) The special LPAR 101 turned off in power supply at the step 3105 is newly activated to operate as a normal LPAR (LPAR type 3. The role of the LPAR is a normal LPAR utilized by for example, the client 50) on the basis of new LPAR setting information 1043 which is input at the step 3016. (It is premised that a LU having an OS installed therein is allocated thereto. (For example, the LPAR operated as a normal LPAR before operating as the special LPAR.))

(Step 3206) The install mode LPAR1 (102A) turned off in power supply at the step 3205 is newly activated to operate as a normal LPAR (LPAR type 3. The role of the LPAR is, for example, a normal LPAR for which the OS installed at the step 3203 is utilized by the client 50) on the basis of new LP setting information 1043 which is input at the step 3016.

In the system according to the present invention, it is made possible to use the same area simultaneously owing to the memory allocation scheme at the step 3011 and the copy of the installer to the install mode LPARs at the step 3014 which did not exist in the conventional technique. Since it has become possible to use the same memory area simultaneously, it becomes possible to handle the OS image 1011 simultaneously and it has become possible to install the OS in a plurality of LPARs simultaneously.

In the system according to the present invention, the hypervisor allocates an area of the physical memory ranging from the physical second address to the physical third address to the special LPAR 101, the install mode LPAR1 (102A) and the install mode LPAR2 (102B) by using a map address table as described heretofore. In this way, the hypervisor conducts memory management of allocating a physical memory area having the OS image 1011 of the special LPAR 101 copied thereto, to the install mode LPAR1 (102A) and the install mode LPAR2 (102B). As a result, the effect that "a plurality of LPARs can access the OS image 1011 simultaneously" is implemented.

Furthermore, according to the present invention, installing utilizing the memory is conducted. As compared with installing using a CD drive, therefore, the speed becomes fast and OS installing in a short time becomes possible.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A virtual computer system comprising:
a physical computer having a physical memory and a physical central processing unit (CPU);
a plurality of logical partitions (LPARs) operating on the physical computer;
an install unit connected to the physical computer, the install unit having an OS image which is an operating system (OS) to be installed in the LPARs, and an installer for installing the OS image; and
a hypervisor configured to exercise control to cause the plurality of LPARs to operate on the physical computer, the hypervisor configured to generate a first LPAR and a second LPAR on a basis of LPAR setting information for managing the LPARs, to map a part of the physical memory to a memory area of the first LPAR, to load the installer into the first LPAR, to invoke the installer in the first LPAR to copy the OS image to the memory area of the first LPAR, to load the installer into the second LPAR; to map the physical memory area of the first LPAR having the OS image copied thereto to a part of a memory area of the second LPAR, in response to a read instruction received at the installer of the second LPAR for the OS, to read out the OS image from the mapped physical memory area of the first LPAR, and to install the OS in the second LPAR.

2. The virtual computer system according to claim 1, wherein the hypervisor is configured to:
generate the first LPAR and the second LPAR of the plurality of LPARs on the basis of LPAR setting information for managing the LPARs;
map a part of the physical memory to a memory area of the first LPAR as a physical memory area;
copy the OS image to the physical memory area mapped as the memory area of the first LPAR;
map the physical memory area mapped as the memory area of the first LPAR having the OS image copied thereto to a part of a memory area of the second LPAR;
convert access to the memory area of the second LPAR, to which the memory area of the first LPAR having the OS image copied thereto is mapped, to access to the memory area of the first LPAR having the OS image copied thereto; and
read out the OS image from the physical memory mapped as the memory area of the first LPAR, and installs the OS in the second LPAR.

3. The virtual computer system according to claim 2, wherein the physical memory area mapped as the memory area of the first LPAR is a memory mapped input output (I/O) area, wherein the memory area of the first LPAR is a memory mapped input output (I/O) area, and wherein the memory area of the second LPAR is a memory mapped input output (I/O) area.

4. The virtual computer system according to claim 2, wherein
in the physical memory, a physical first address is designated as a lowest-order address and addresses in a range of a physical second address to a physical third address are designated as addresses of an area to which the OS image is copied,
in the memory area of the first LPAR, a special first address is designated as a lowest-order address and addresses in a range of a special second address to a special third address are designated as addresses of an area to which a physical memory area having the OS image copied thereto is mapped, and
in the memory area of the second LPAR, an install first address is designated as a lowest-order address and addresses in a range of an install second address to an install third address are designated as addresses of an area to which the memory area of the first LPAR having the OS image copied thereto is mapped.

5. The virtual computer system according to claim 1, wherein at least one second LPAR is generated.

6. The virtual computer system according to claim 1, wherein the install unit is a compact disc (CD) drive.

7. The virtual computer system according to claim 1, wherein the hypervisor is configured to generate a third LPAR on a basis of LPAR setting information for managing the LPARs.

8. The virtual computer system according to claim 7, wherein
the first LPAR is an LPAR hidden from external clients/users of the virtual computer system,
the second LPAR is an LPAR for installing the OS in the LPARs, and
the third LPAR is an LPAR utilized by the external clients/users of the virtual computer system.

9. The virtual computer system according to claim 1, wherein the LPAR setting information is used to manage identifiers of the LPARs and memory capacities mapped to the LPARs.

10. An installing method in virtual computer system the virtual computer system comprising:
a physical computer having a physical memory and a physical CPU;
a plurality of LPARs operating on the physical computer;
an install unit connected to the physical computer, the install unit having an OS image which is an OS to be installed in the LPARs and an installer for installing the OS image; and
a hypervisor configured to exercise control to cause the plurality of LPARs to operate on the physical computer, the installing method causing the hypervisor to execute the steps of:
generating a first LPAR and a second LPAR on a basis of LPAR setting information for managing the LPARs;
mapping a part of the physical memory to a memory area of the first LPAR;
loading the installer into the first LPAR;
invoking the installer in the first LPAR to copy the OS image to the memory area of the first LPAR;
loading the installer into the second LPAR;
mapping the memory area of the first LPAR having the OS image copied thereto to a part of a memory area of the second LPAR, in response to a read instruction received at installer of the second LPAR for the OS;
reading out the OS image from the mapped physical memory area of the first LPAR and installing the OS in the second LPAR.

11. An installing method in virtual computer system according to claim 10, wherein the installing method causes the hypervisor further to execute the steps of:
generating the first LPAR and the second LPAR on the basis of LPAR setting information for managing the LPARs;
mapping a part of the physical memory to a memory area of the first LPAR;
copying the OS image to a physical memory area mapped as the memory area of the first LPAR;
mapping the physical memory area mapped as the memory area of the first LPAR having the OS image copied thereto, to a part of a memory area of the second LPAR;
converting access to the memory area of the second LPAR to which the memory area of the first LPAR having the OS image copied thereto is mapped, to access to the memory area of the first LPAR having the OS image copied thereto; and
reading out the OS image from the physical memory mapped as the memory area of the first LPAR, and installing the OS in the second LPAR.

12. An installing method in virtual computer system according to claim 11, wherein the physical memory area mapped as the memory area of the first LPAR is a memory mapped input output (I/O) area, wherein the memory area of the first LPAR is a memory mapped input output (I/O) area, and wherein the memory area of the second LP is a memory mapped I/O area.

13. An installing method in virtual computer system according to claim 12, wherein
in the physical memory, a physical first address is designated as a lowest-order address and addresses in a range of a physical second address to a physical third address are designated as addresses of an area to which the OS image is copied,
in the memory area of the first LPAR, a special first address is designated as a lowest-order address and addresses in a range of a special second address to a special third address are designated as addresses of an area to which a physical memory area having the OS image copied thereto is mapped, and
in the memory area of the second LPAR, an install first address is designated as a lowest-order address and addresses in a range of an install second address to an install third address are designated as addresses of an area to which the memory area of the first LPAR having the OS image copied thereto is mapped.

* * * * *